United States Patent [19]

Kishi et al.

[11] Patent Number: 4,785,155
[45] Date of Patent: Nov. 15, 1988

[54] AUTOMATIC WELDING MACHINE PATH CORRECTION SYSTEM

[75] Inventors: Hajimu Kishi, Hino; Shinsuke Sakakibara, Komae; Haruyuki Ishikawa, Shinjuku, all of Japan

[73] Assignee: Fanuc Ltd., Yamanashi, Japan

[21] Appl. No.: 871,438

[22] PCT Filed: Oct. 4, 1985

[86] PCT No.: PCT/JP85/00552
§ 371 Date: May 23, 1986
§ 102(e) Date: May 23, 1986

[87] PCT Pub. No.: WO86/02030
PCT Pub. Date: Apr. 10, 1986

[30] Foreign Application Priority Data

Oct. 5, 1984 [JP] Japan .................. 59-209336

[51] Int. Cl.$^4$ ............................................. B23K 9/12
[52] U.S. Cl. ......................... 219/125.12; 219/124.22
[58] Field of Search ........... 219/125.1, 125.12, 124.22, 219/124.34; 901/42

[56] References Cited

U.S. PATENT DOCUMENTS 4,302,655 11/1981 Edling ..................... 219/125.12

FOREIGN PATENT DOCUMENTS 0076498 4/1983 European Pat. Off. ......... 219/125.1
56-148473 11/1981 Japan .
58-112661 7/1983 Japan .

Primary Examiner—Clifford C. Shaw
Attorney, Agent, or Firm—Staas & Halsey

[57] ABSTRACT

A path correction system of an automatic welding machine has means for differentiating welding current values at respective left and right positions of a torch when weaving is performed, and means for sensing welding current when a value obtained from the differentiating means is zero. The difference is found between welding current values when left and right differentiated values are zero, and the position of the center of the weaving pattern along which the torch advances is corrected based on the difference value.

6 Claims, 4 Drawing Sheets

AUTOMATIC WELDING MACHINE PATH CORRECTION SYSTEM

BACKGROUND OF THE INVENTION

1. Field of the Invention

This invention relates to an automatic welding machine path correction system and, more particularly, to a path correction system in an automatic welding machine for performing welding while weaving a welding torch left and right with respect to a welding line.

2. Description of the Related Art

An automatic welding machine performs welding by applying a voltage across a wire and a workpiece to produce an arc at the tip of the wire, causing the wire and the workpiece to be melted by the heat generated by the arc, and moving the wire tip along a welding path while the wire is successively paid out in small increments, thereby welding the workpiece. FIG. 8 is a schematic view of such a welding machine. In FIG. 8 wire WR is paid out in small increments in the direction of the arrow by feed rollers FR via a guide member GB so that its tip protrudes from the end of a torch TC. The rate of feed of the wire WR is limited so that the tip of the wire will be spaced a predetermined distance from the surface of the workpiece WK. A welding power supply PS, which applies the voltage across the wire WR and the workpiece WK continuously generates a high voltage for a predetermined period. The positive potential is applied to the wire WR through the guide member GB, and the negative potential is connected to the workpiece WK. In the torch TC, $CO_2$ gas is supplied by a gas supply unit, which is not shown. Welding is performed while the $CO_2$ gas is jetted toward the portion being welded, thereby preventing oxidation of the welded portion.

When a high voltage is generated continuously by the welding power supply PS while the $CO_2$ gas is fed from the gas supply unit, not shown, and the wire WR is paid out in small increments, an arc is produced at the tip of the wire and both the wire and the portion of the workpiece being welded are melted, fusing the portions of the workpiece together. It has recently become possible to perform such a welding operation automatically by robot. Specifically, the torch TC of the welding machine is grasped by a robot, which moves the torch (the tip of the wire) along a welding path to weld the workpiece.

When weaving is performed along a welding line CT, as shown in FIG. 6, the robot control unit moves the torch TC upon calculating the extreme points to the left and right from starting and end points, which have been taught, as well as amplitude and frequency of the weaving pattern. However, in cases where there are differences in the machined precision of the workpiece or where there is a shift in the location to be welded, welding cannot be performed accurately at the predetermined location of the workpiece when the torch TC is moved based on the taught points. Accordingly, as shown in FIG. 7, the conventional practice is to monitor the value of the integral of the welding current and effect a path correction upon comparing the integral value with a reference value when the difference between an integral value prevailing at a leftward swing and an integral value prevailing at a rightward swing in one cycle exceeds a stipulated value.

With this method of correcting the path based on the integrated value of the welding current, sensitivity is very low, especially when the current is small, and the method is not suited to some welding modes as far as the welding characteristics are concerned.

SUMMARY OF THE INVENTION

An object of the present invention is to provide an automatic welding machine path correction system capable of correcting a welding path smoothly and accurately irrespective of the welding mode.

According to the present invention, there is provided a path correction method in an automatic welding machine which welds while weaving a welding torch to the left and right of a welding line. The first step is calculating interpolated points of a weaving path, which has a trapezoidal shape for a half cycle, from a given starting point, end point, amplitude and frequency. In the second step, the torch is moved along the path calculated in the first step, and the welding current is sensed when the torch is operating parallel to the welding line (namely in the vicinity of the left and right extremes of the weaving pattern). In the third step, the weaving path is corrected based on the difference between welding currents sensed at the left and right extreme points of weaving in the second step.

Further, according to the present invention, there is provided a path correction system of an automatic welding machine. The system performs welding while weaving a welding torch to the left and right of a welding line, line on a workpiece. A welding power supply supplies the torch with current. Current sensing means senses the welding current supplied to the torch by the welding power supply, when means for causing the current sensing means to sense welding current, which occurs when the torch is at the far left and right positions when weaving is performed. The system further includes means for subtracting the left and right welding current values and correcting, based on the difference, the center of the weaving pattern traversed by the torch.

The present invention makes it possible to accurately sense the extreme points of the weaving pattern and to correct the welding path smoothly irrespective of the welding mode.

DESCRIPTION OF THE PREFERRED EMBODIMENT

An embodiment of the present invention will now be described in detail with reference to FIGS. 1 through 3.

In a case where a V- or L-shaped beveled portion is to be welded by a weaving pattern, the present invention monitors welding current to correct weaving in such a manner that the center of weaving conforms to the center (welding line CT) of the beveled portion. When it is judged that a path correction is necessary, the amount of the correction is reflected in the path calculation of the next cycle, whereby the correction is made during the next cycle.

In order to effect the weaving path correction, a weaving frequency higher than 0.4 Hz is required, and the path correction is performed based on the symmetry of a change in welding current when the welding motion is made to the left and right during weaving. Accordingly, the beveled shape is formed so as to be symmetrical within the range in which the weaving motion is made.

Figure 1:
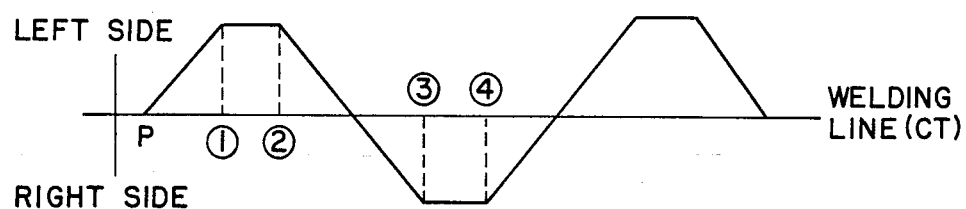
FIG. 1 is a diagram explanatory of a weaving pattern used in the present invention.

FIG. 1 illustrates a weaving pattern used in the present invention. The weaving pattern defines a trapezoidal pattern having a path whose left and right extremes lie parallel to the welding line.

Figure 2:
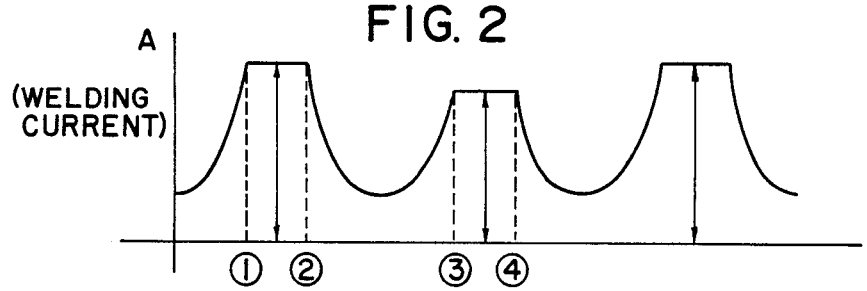
FIG. 2 is a diagram showing the change in welding current corresponding to the weaving pattern shown in FIG. 1.
Figure 3:
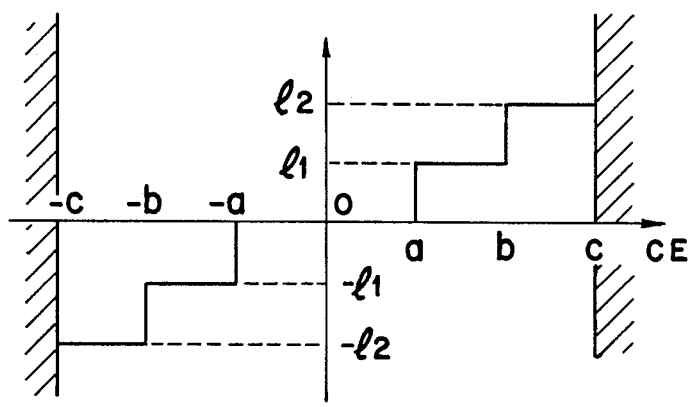
FIG. 3 is a diagram for describing the manner in which a correction amount is decided.

FIG. 2 illustrates the change in welding current corresponding to the weaving pattern shown in FIG. 1.

As is evident from FIG. 2, the welding current has a differential value (rate of change) of a certain magnitude up to a point ①. However, when the torch TC begins to move along the side wall of the workpiece, namely when the torch is located between points ① and ② on the path parallel to the welding line, there is no change in the welding current and, hence, the differential value is zero.

A control unit is capable of sensing the welding current at the extremes of the weaving pattern by taking a sampling of values at the extremes. Alternatively, the detection of the welding current at the extremes of the weaving pattern need not rely upon sampled values as mentioned above but can be accomplished by obtaining the average value of welding currents from extreme point ① to extreme point ② on the path, which lies parallel to the welding line, where the amount of change in the welding current is zero.

Let us now describe a welding path correction.

Let CE represent a current error in determining the amount of correction, RD the amount of welding current sensed on the right side of the welding line, and LD the amount of welding current sensed on the left side of the welding line. In general, then, we will have $$CE = LD - RD \qquad (1)$$

In other words, in order to effect a path correction, it is necessary to constantly monitor the symmetry of the change in the welding current when welding motion takes place to the left and right at the time of weaving.

An amount of bias to one side can be allowed for when necessary. For example, if it is desired to allow for an amount of bias on the right side, then we will have $$CE = (LD - BR) - RD \qquad (2)$$

In this way it is possible to deal with a workpiece having left-right asymmetry.

Determining the amount of path correction will be described next. FIG. 3 is a view for describing the manner in which the amount of path correction is decided. In FIG. 3, a and b, and c denote values of the above-mentioned current error CE, and $l_1$, $l_2$ represent designated values of parameters serving as the basis of a correction value. Here it is appropriate to set changes in the current error value CE to steps of e.g. 0.1 A, and to set the parameter designation values, which serve as the basis of a correction value, to steps of 0.1 mm.

Accordingly, if the current error CE is a, namely 0.1 A, then the control unit will correct the center of weaving by a correction amount $l_1$, namely 0.1 mm.

Note that when the current error CE exceeds ±0.3 A, an alarm is issued and the control unit stops the welding operation. In other words, if the current error becomes too large, a path correction cannot be made in a normal manner.

A welding robot for practicing the present invention will now be described in brief.

Figure 4:
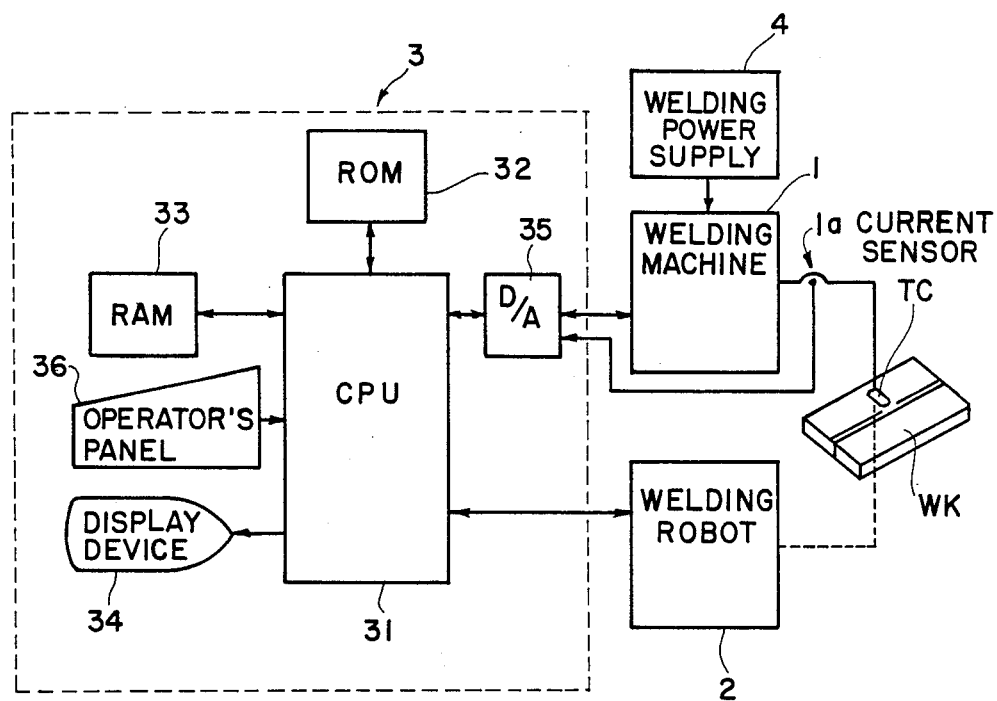
FIG. 4 is a block diagram illustrating a welding robot.

FIG. 4 is a block diagram schematically illustrating a welding robot. In FIG. 4, numeral 1 denotes a welding machine, and numeral 2 represents a welding robot having a hand which grasps the torch TC of the welding machine and moves the torch TC along the workpiece WK in accordance with taught data. Numeral 3 denotes a numerical control unit for controlling the welding machine 1 and the welding robot 2. Numeral 4 represents a welding power supply for supplying the torch TC with a welding current. The numerical control unit 3 has a central processor (CPU) 31 for controlling the overall numerical control unit and for executing processing, a read-only memory (ROM) 32 storing a control program, a random-access memory (RAM) 33 for temporarily storing various data such as the data the robot has been taught, an operator's panel 36 for entering various welding conditions and and welding activities, and for teaching such to the welding robot. A display device 34 for displaying a program list, data and the present position of the torch TC, and an digital-/analog converter (D/A) 35 for converting digital command values received from the CPU 31 into analog command values and for delivering these analog command values to the welding machine 1.

It should be noted that the welding current supplied from the welding machine 1 to the torch TC is measured by a current sensor 1a, which sends the measured value to the numerical control unit 3.

Figure 5:
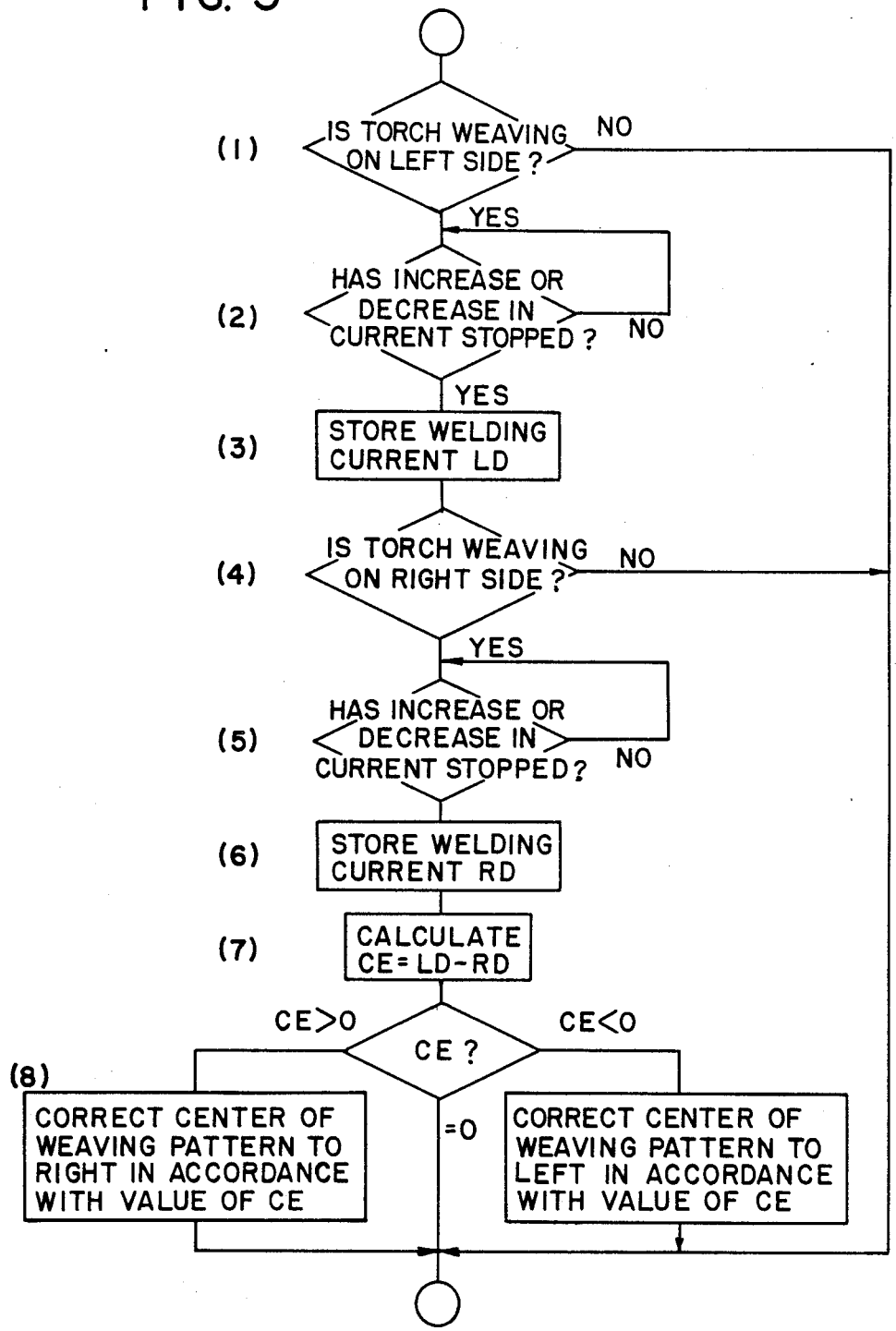
FIG. 5 is a flowchart for describing the operation of the present invention.
Figure 6:
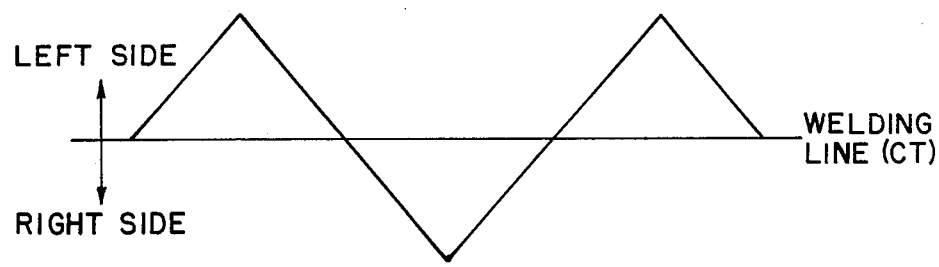
FIG. 6 is a diagram explanatory of a conventional weaving pattern.
Figure 7:
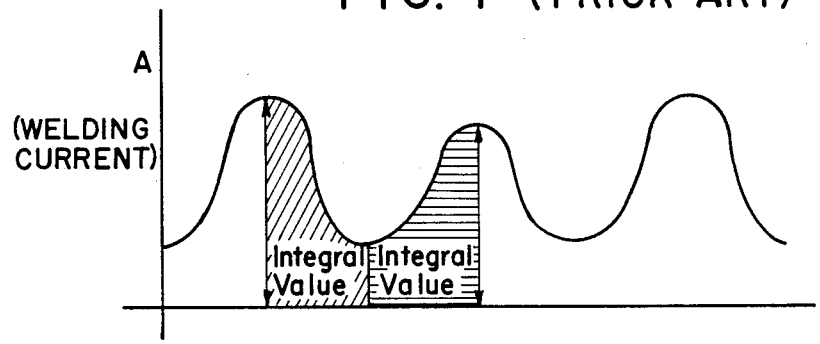
FIG. 7 is an example of a conventional manner of correcting a path.
Figure 8:
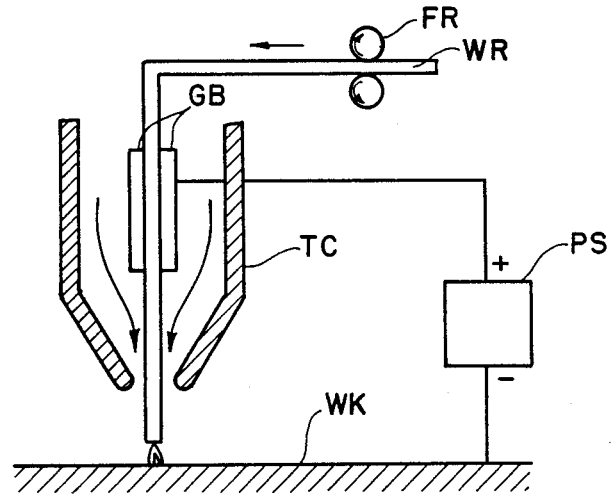
FIG. 8 is a schematic view of a welding machine.

The operation of the invention will now be described using the flowchart shown in FIG. 5.

Let us assume that, prior to the execution of welding, the welding robot has been taught the necessary data, such as welding line (CT) position data and a weaving command format for commanding a weaving operation, by means of a teaching operation, that initial motion of the torch TC has ended, that the torch TC is at a point P in FIG. 1 in the course of operation, and that the torch is to be moved from this position.

The torch TC starts to be moved from point P to the left side [step (1)]. This motion is effected by using two items of data, namely a frequency f and an amplitude value, commanded earlier in the weaving command format. Meanwhile, the welding current supplied to the torch TC from the welding machine 1 is constantly being sensed by the current sensor 1a, which sends the resulting signal to the numerical control unit 3. Motion of the torch TC is monitored at all times by the CPU 31. When the torch TC reaches the area between points ① and ② in FIGS. 1 and 2, and the area in which the change in welding current ceases, the current value LD prevailing at this time is stored in the RAM 33 [steps (2) and (3)]. It should be noted that monitoring the cessation of the change in current can be performed at the position of the torch TC, as described above, or by differentiating the welding current.

As the movement of the torch TC proceeds, the torch moves to the right side of the welding line CT [step (4)]. In the meantime, however, the welding current supplied to the torch TC by the welding machine 1 is constantly sensed by the current sensor $1a$, whose output signal is applied to the numerical control unit 3, and motion of the torch TC is constantly monitored by the CPU 31. When the torch TC reaches the area between paints (3) and (4) in FIGS. 1 and 2, the area in which the change in welding current ceases, the current value RD prevailing at this time is stored in the RAM 33 [steps (5) and (6)].

The calculation $$(LD - RD) = CE$$

ps is performed during one cycle of the welding operation [step (7)]. If the result of the calculation is zero, i.e. the error current CE has a value of zero, there is no left-right positional correction with respect to the center of the weaving pattern along which the torch TC advances. If the result of the calculation is a positive (+) value, the position of the center of the weaving pattern along which the torch TC advances is too far to the left. In the next cycle of the welding operation, therefore, the position is corrected to the right side by the magnitude of the current error CE.

If the result of the calculation is a negative (−) value, the position of the center of the weaving pattern along which the torch TC advances is too far to the right. Therefore, in the next cycle of the welding operation, the position is corrected to the left side by the magnitude of the current error CE [step (8)].

Thus, as set forth above, the present invention monitors the amount of change in the welding current at the time of weaving, senses the welding current at the left and right extremes where the amount of change is zero, and corrects the weaving path based on the difference between the current values at the left and right extremes. Accordingly, the extreme points of the weaving pattern can be accurately sensed and the welding path can be corrected smoothly irrespective of the welding mode. This makes it possible to reduce the labor and energy involved in the welding operation and to enhance both the efficiency and reliability of the operation.

Though the present invention has been described based on an embodiment, the invention is not limited to this embodiment but can be modified in various ways in accordance with the gist of the present invention, such modifications being within the scope of the invention.

As described above, the automatic welding machine path correction system according to the present invention enables the path of a welding torch to be corrected automatically and therefore is well-suited for application to a welding robot having a soft weaving function.

We claim:

1. A method of path correction for an automatic welding machine which welds while weaving a welding torch to the left and right of a welding line, said method comprises the steps of:
    (a) calculating a weaving path from a given starting point, end point, amplitude and frequency, the weaving path having sections parallel to the welding line at left and right extremes from the welding line;
    (b) moving the torch along the weaving path calculated in step (a) and sensing a left side welding current and a right side welding current at the left and right extremes of the path parallel to the welding line when the torch is at the left and right extremes of the weaving path;
    (c) obtaining a difference between the left side welding current and the right side welding current;
    (d) implementing a weaving path correction based on the difference if the difference is less than a predetermined value; and
    (e) issuing an alarm and halting welding if the difference is greater than the predetermined value.

2. A method of path correction for an automatic welding machine according to claim 1, wherein step (b) further comprises adding a predetermined left side or right side bias value to the sensed left side or right side welding current.

3. A method of path correction for an automatic welding machine according to claim 1, wherein the weaving path has a trapezoidal shape on both the left and right sides of the welding line.

4. A method of path correction for an automatic welding machine according to claim 3, wherein a welding robot holds the torch and is commanded by said path correction system.

5. A path correction system for an automatic welding machine having a torch for welding a workpiece and a welding power supply for supplying said torch with current, said automatic welding machine performs welding while following a weaving pattern with the welding torch along a welding line, said system comprises:
    current sensing means for sensing welding currents supplied to the torch by said welding power supply;
    means for causing said current sensing means to sense left side and right side welding currents being supplied to the torch by the welding power supply when the torch is at left and right extremes from the welding line in the weaving pattern; and
    means for obtaining the difference between the sensed left and right welding currents and correcting the weaving pattern traversed by the torch if the difference is less than a predetermined value and halting operation of the automatic welding machine and issuing an alarm if the difference is greater than the predetermined value.

6. A patch correction system for an automatic welding machine according to claim 5, further comprising a welding robot for holding the torch, said robot being commanded by said path correction system.

* * * * *